US011970841B2

(12) United States Patent
Serrurier

(10) Patent No.: US 11,970,841 B2
(45) **Date of Patent: *Apr. 30, 2024**

(54) ELECTRONICALLY OPERATED LOCKING SYSTEM FOR EARTH MOVING EQUIPMENT AND METHOD

(71) Applicant: Caterpillar Inc., Peoria, IL (US)

(72) Inventor: Douglas C. Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,730

(22) Filed: Nov. 5, 2021

(65) Prior Publication Data

US 2022/0056675 A1 Feb. 24, 2022

Related U.S. Application Data

(62) Division of application No. 16/678,276, filed on Nov. 8, 2019, now Pat. No. 11,230,827.

(51) Int. Cl.
*E02F 9/28* (2006.01)
*E05B 47/00* (2006.01)

(52) U.S. Cl.
CPC .......... *E02F 9/2825* (2013.01); *E02F 9/2833* (2013.01); *E02F 9/2858* (2013.01); *E05B 47/00* (2013.01)

(58) Field of Classification Search
CPC .... E05B 47/0001; E02F 9/2825; E02F 9/2833
See application file for complete search history.

(56) References Cited

U.S. PATENT DOCUMENTS 3,333,893 A * 8/1967 Heimaster ............... E21C 35/24 299/1.2
5,063,696 A * 11/1991 Smith ................... E02F 9/2833 37/446
5,159,312 A * 10/1992 Engle ....................... B60D 1/60 307/9.1
5,709,043 A 1/1998 Jones et al.
5,743,031 A * 4/1998 Launder .................. E02F 9/267 37/906

(Continued)

FOREIGN PATENT DOCUMENTS

CN 102815396 12/2012
CN 105452572 3/2016

(Continued)

OTHER PUBLICATIONS

Chinese Patent Office Second Office Action for China Patent Appln. No. 202080076866.4, dated Jul. 6, 2023 (6 pgs) with English Summary (2 pgs).

(Continued)

*Primary Examiner* — Gary S Hartmann

(57) ABSTRACT

An adaptor includes a body defining a longitudinal axis, and a transverse axis that is normal to the longitudinal axis. The body also has a leading portion defining a lock receiving recess extending transversely at least partially through the leading portion, and a wire receiving conduit that is in communication with the lock receiving recess. The lock receiving recess defines a width and a depth with a ratio of the depth to width is greater than 1.0.

10 Claims, 7 Drawing Sheets

(56) References Cited

U.S. PATENT DOCUMENTS

| | | | | |
|---|---|---|---|---|
| 6,870,485 | B2 * | 3/2005 | Lujan | E21C 35/04 340/480 |
| 9,234,332 | B2 * | 1/2016 | Marchand | E02F 9/2841 |
| 9,234,422 | B2 * | 1/2016 | Hall | E21C 35/18 |
| 10,011,975 | B2 * | 7/2018 | Carpenter | E02F 9/2833 |
| 10,217,582 | B2 | 2/2019 | Smith | |
| 10,293,800 | B2 | 5/2019 | Yokoyama et al. | |
| 10,774,500 | B2 | 9/2020 | Harder et al. | |
| 11,098,463 | B2 | 8/2021 | Serrurier | |
| 11,230,827 | B2 * | 1/2022 | Serrurier | E05B 47/00 |
| 11,401,682 | B2 * | 8/2022 | Harder | E02F 3/407 |
| 2016/0038239 | A1 | 2/2016 | Yamanaka et al. | |
| 2018/0142447 | A1 | 5/2018 | Popp et al. | |
| 2018/0258607 | A1 | 9/2018 | Harder et al. | |
| 2020/0141084 | A1 | 5/2020 | Harder et al. | |
| 2022/0333336 | A1 * | 10/2022 | Harder | E02F 9/2808 |

FOREIGN PATENT DOCUMENTS

| | | |
|---|---|---|
| CN | 109372054 | 2/2019 |
| CN | 109469134 A | 3/2019 |
| CN | 109891038 | 6/2019 |
| WO | 2018161166 | 9/2018 |

OTHER PUBLICATIONS

Chinese Patent Office First Office Action for Chinese Patent Application No. 202080076866.4, dated Dec. 12, 2022 (5 pgs).

* cited by examiner

ELECTRONICALLY OPERATED LOCKING SYSTEM FOR EARTH MOVING EQUIPMENT AND METHOD

CROSS-REFERENCE TO RELATED APPLICATION

This application is a divisional application of application Ser. No. 16/678,276, filed on Nov. 8, 2019, having the same title, claiming priority thereto and incorporating its contents herein by reference in its entirety.

TECHNICAL FIELD

The disclosure relates to earth moving equipment and machinery and in particular to the retention of for example teeth on such earth moving machinery. In particular, the disclosure relates to new power operated locking systems in such teeth, operated electrically or electronically for moving individual locking mechanisms between locked and unlocked positions. The locking system according to the disclosure is concealed entirely within the components of the earth moving machinery such as tooth mounts (may also be referred to as adaptors) and the teeth themselves, so that the locking systems are not exposed in the environment in which the machinery is used.

BACKGROUND

Many machines particularly earth moving machines, include ground engaging tools for performing tasks like digging, tilling ripping, loading, and/or excavation tasks and the like. Such ground engaging tools often include a shovel or scoop (bucket) with one or more lips with edges on them. If such lips are left unprotected, contact with soil, rock and other materials may damage or wear the edges of the lips. Repairing or replacing the lip of such a ground engaging tool due to wear or damage of the edge may involve significant expense. Accordingly, many ground engaging tools include ground engaging members such as teeth, adaptors, and shrouds which are mounted to the lip to shield the edge of the lip from contact with soil, rock, and other materials.

In most cases, such teeth and adaptors were secured to the shovel by some form of wedge-like device. In many cases such wedges were secured in place manually, often by simply hammering. In other cases, various different locks or wedge systems were developed, in which the wedging was affected by means of some form of threaded mechanism. The threaded mechanism, in turn, was operated by hand, or with a wrench.

It will be understood that even the more complex threaded mechanisms for locking the teeth on the adaptors, still had to be accessible from the exterior of the tooth or adaptor or both. This was admitted as a possible cause of problems, due to the harsh environment of alternately moving the shovel into the earth or debris and then removing it again. The teeth and the mechanisms were subject to extreme abrasion and forces operating first to push the teeth on and then pull the teeth off the adaptors, and so on.

As and when the teeth have to be replaced, then the shovel would have to be cleaned up to make the removal mechanism accessible. In the event that the locking mechanism had become damaged due to use, then removing such locking mechanism in turn became a problem.

Accordingly, it is desirable to develop a mechanism for locking teeth on the adaptors that is less prone to damage or wear.

SUMMARY OF THE DISCLOSURE

An adaptor for use with a power locking device according to an embodiment of the present disclosure is provided. The adaptor may comprise a body defining a longitudinal axis, and a transverse axis that is normal to the longitudinal axis. The body may include a leading portion defining a lock receiving recess extending transversely at least partially through the leading portion, and a wire conduit that is in communication with the lock receiving recess. The lock receiving recess may define a width and a depth, and a ratio of the depth to the width is greater than 1.0.

A power locking device according to an embodiment of the present disclosure may comprise a body defining a longitudinal axis, a first axial end disposed along the longitudinal axis, a second axial end disposed along the longitudinal axis, and a blind bore extending from the first axial end including a bottom surface disposed proximate the second axial end. A motor may be disposed in the blind bore, and a gear reducer may be disposed proximate to the motor in the blind bore. Also, a lead screw may be disposed in the blind bore that is connected to the gear reducer. A sliding lock member may include a threaded aperture that receives the lead screw.

A method for attaching and detaching a tip to an adaptor using a power locking device according to an embodiment of the present disclosure is provided. The method may comprise inserting a tip having a hollow interior over the leading portion of the adaptor until a power locking device is aligned with an aperture of either the tip or the adaptor, and electrically or electronically activating the power locking device via hardwiring so that a locking member moves into the aperture, retaining the tip onto the adaptor.

DETAILED DESCRIPTION

Figure 1:
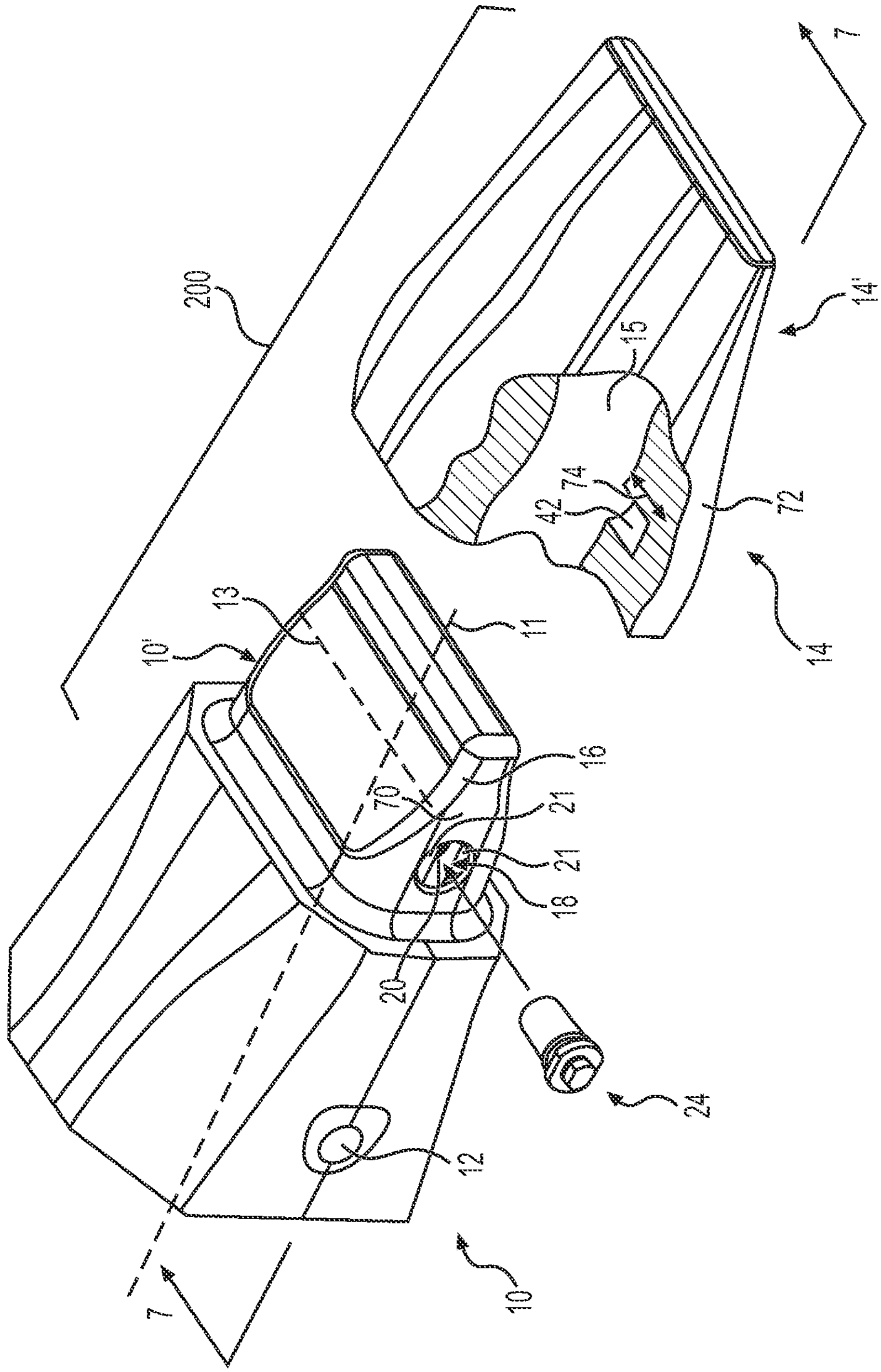
FIG. 1 is an exploded view of an adaptor, the tooth, and the locking device.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

As alluded to earlier herein, various embodiments of the present disclosure provide a power operated lock for use on earth moving machinery, and the like. More specifically, such machinery may have some kind of a shovel (100, see FIG. 9) or scrapers, buckets, rakes, shears, etc. The lip (102) of such a shovel (100) is provided with teeth (14). To secure the teeth (14), the shovel lip (102) will have a series of mounting members. These may be themselves removable adaptors (10) or may be welded to the lip (102) at spaced intervals. There may be twenty such mounting members (e.g. adaptors (10)) on a shovel (100), for example, the number depending on the size, and the design of such a shovel (100). These mounting members usually take the form of removable adaptors (10). Teeth (14) are then secured on the adaptors (10). In most case both the adaptors (10), and also the teeth (14) are held on the shovel (100) by some kind of lock or wedge. These typical locks or wedges are exposed at least in part to the outside environment around the teeth and adaptors. As a result, during use of the shovel, these locks and wedges are exposed to extreme wear and stresses as the shovels are moved into the earth, and when the earth is tipped out if the shovel, for example. When teeth, or even adaptors, become damaged or worn, they must be replaced. This involves removing the wedge, discarding the damaged component and replacing it with a new one.

In some cases, the wedge itself is damaged or difficult to dislodge.

In particular embodiments, there may be for example twenty separate adaptors (10), carrying twenty separate teeth (14). The locking devices can be such that they will fit both the locking of the adaptors (10) on the shovel mounting members, and also locking of the teeth (14) on the adaptors (10), but not necessarily so.

Various embodiments of the present disclosure may include a locking device (24) for such a purpose, i.e. locking either teeth (14) onto their adaptors (10) or locking the adaptors (10) on tool mounts on the shovel (100), etc. Each locking device (24) may be concealed within the adaptor (10) or tooth (14) or tool mount, and may be self-contained, carrying its own internal power operated mechanism.

Moreover, the teeth (14) and the adaptors (10) may be formed with internal cavities or recesses. One of the cavities may be configured to receive the locking device (24) within it, i.e. within the interior of the adaptor (10) or mount. The other tool, either the adaptor (10) or the tooth (14) itself, may be provided with an interior socket, which may be configured to register with the interior cavity formed in the mount or adaptor (10). By wireless remote technology, the locking device (24) can be activated so as to lock the adaptor (10) on the mount, or to lock the tooth (14) on the adaptor (10). The locking devices (24) themselves may remain entirely concealed within the mount or adaptor (10), and may therefore be protected from damage in use in the environment.

The internal power operated mechanism may incorporate wireless technology (e.g. Blue-Tooth, Wi-Fi, Radio Frequency, infra-red, etc.) and can be activated by a wireless remote control.

Figure 9:
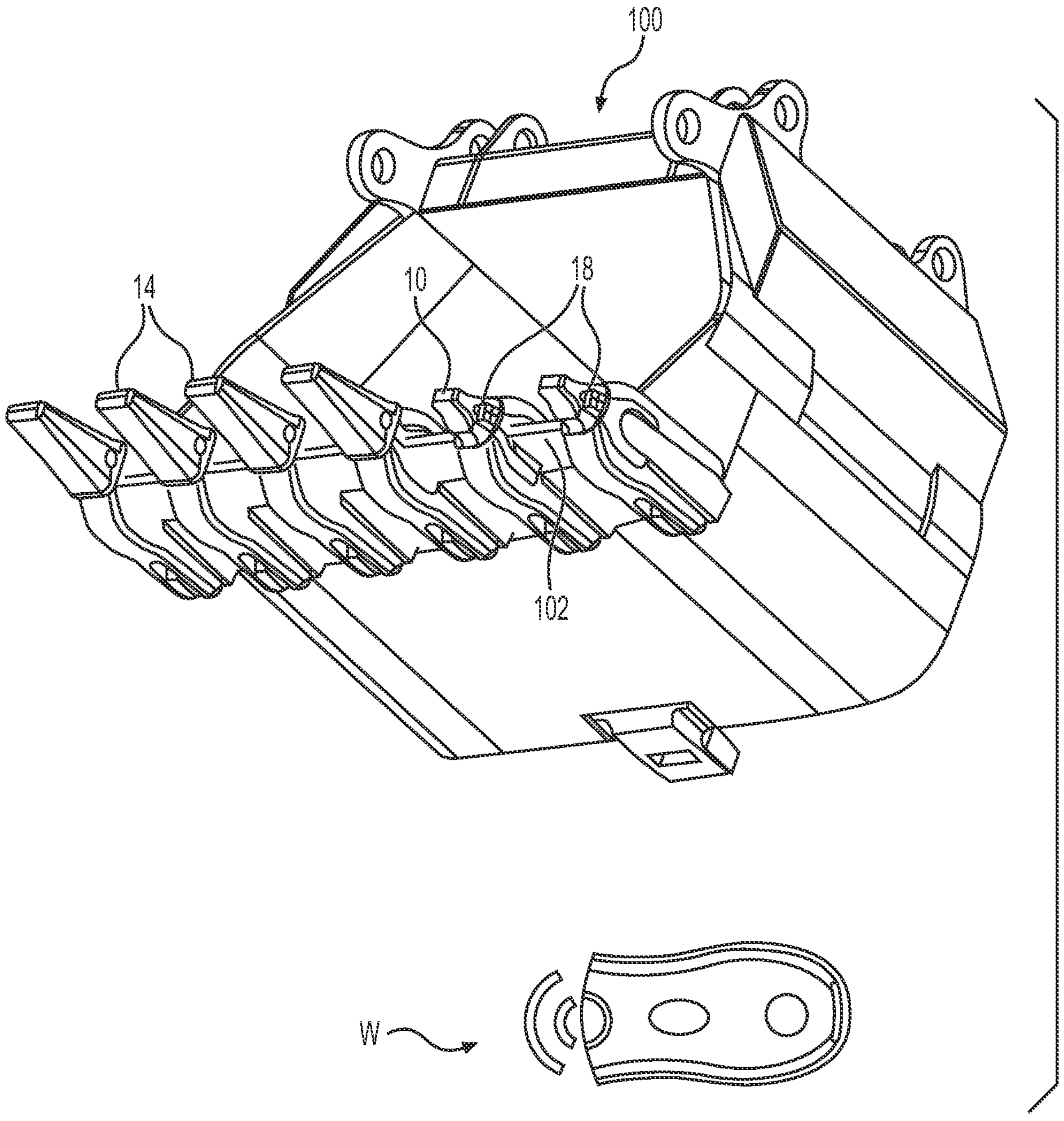
FIG. 9 is a schematic perspective of a shovel and remote controller to which the various embodiments of the present disclosure relates.

FIG. 1 shows an adaptor (10), typically such as can be secured on a support member on a shovel (100) (as shown in FIG. 9). This adaptor (10) is of the type that can itself be removed from the shovel support member and replaced as needed. The adaptor (10) has a lock recess (12) to receive any suitable lock (not shown), by which the adaptor (10) may be locked on the shovel support member. This may not be the case for other embodiments of the present disclosure.

The adaptor (10) in this case is designed to support a tooth (14). The tooth (14) may have a hollow interior (15) which fits over the leading portion (16) (i.e. the nose) of the adaptor (10).

The leading portion (16) of the adaptor may have a body with a transverse cylindrical lock receiving recess (18) (i.e. extends along the transverse axis (13)), in one side.

In addition, the adaptor body may have a longitudinal axis (11) that is perpendicular to the transverse axis (13), extending in the direction of the shovel movement. The cylindrical lock receiving recess (18) may be located on an axis normal to longitudinal axis (11) (e.g. along a direction perpendicular to the longitudinal axis (11)). In this way, the locking device (24) may extend outwardly and inwardly in a transverse direction to the longitudinal axis (11) of the adaptor (10).

Looking closer at the recess (18), the recess (18) may have a rim (20) with two linear portions (21).

Also, the tooth (14) may have a hollow body (15) with an interior hidden lock receiving socket (42) within the hollow body. A locking device (24) may be provided that is configured to fit within the lock receiving recess (18) of adaptor (10).

Looking at FIGS. 2 thru 6, a locking device (24) according to an embodiment of the present disclosure may be seen more clearly.

The locking device (24) may have a generally cylindrical body (26), defining a hollow interior (28). A sliding lock member (30) of partly cylindrical shape may be provided that is slidable within the interior (28) of body (26). The lock member (30) is attached to a linear gear rack (32) formed with gear teeth. A drive gear (34) may be provided that engages the gear teeth on the rack (32). The gear (34) may be driven by an electric motor (36). Motor (36) is controlled and powered by circuits and battery (38), located within the interior (28) of body (26).

Sealing rings (40) may also be provided as needed on body (26).

The tooth (14) may have a hollow interior (15) (see FIG. 7), which fits over the leading end (16) of adaptor (10). Tooth (14) is formed with an interior lock receiving socket (42) in one side of the hollow interior of tooth (14), and is inaccessible from the exterior of the tooth (14). When the tooth (14) is fitted over the leading end (16) of the adaptor (10), the socket (42) is located so as to align with lock receiving recess (18) of adaptor (10) and receive the sliding lock member (30).

Again, the socket (42) in the tooth (14) may be aligned along a direction parallel to the transverse axis (13) of the tooth (14). Thus, when the tooth (14) is fitted over the adaptor (10), the recess (18) and the socket (42) may be both aligned with one another and are aligned transverse to the longitudinal axis (11) of the tooth (14) and the adaptor (10).

Figure 7:
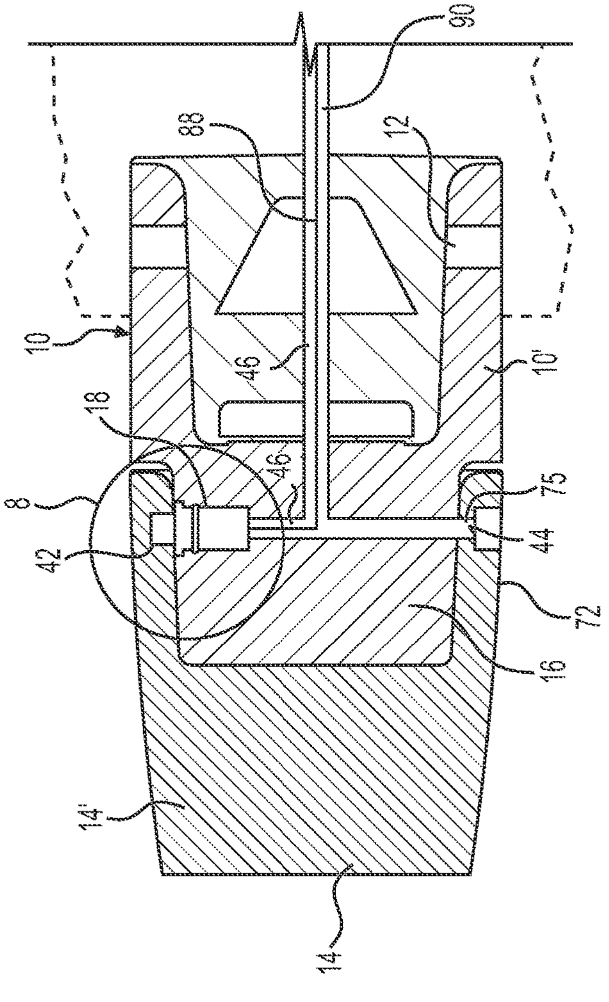
FIG. 7 is a sectional view of FIG. 1 taken along lines 7-7 thereof.
Figure 8:
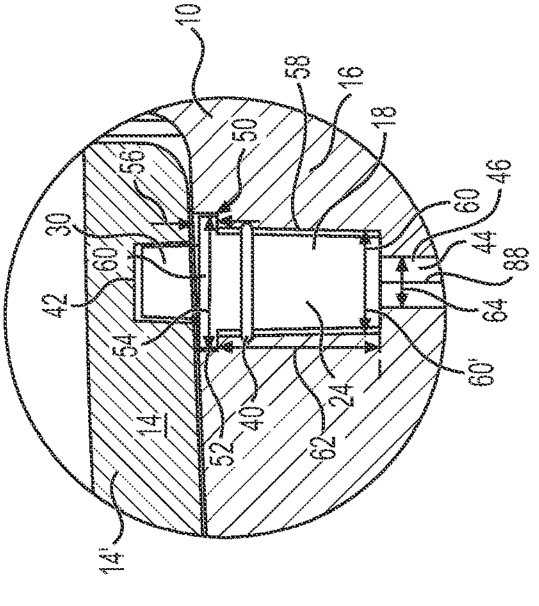
FIG. 8 is an enlarged detail view taken at circle 8 of FIG. 7.

As best seen in FIGS. 7 and 8, small diameter access drillings (44) may be formed in adaptor (10) and in tooth (14), aligned with one another. Drillings (44) may connect with the inner end of recess (18) to enable service persons to reach the locking device (24) from outside the tooth (14).

Otherwise, it can be seen that the locking device (24) is entirely or substantially concealed within the body of the adaptor (10), and the tooth (14), and is not exposed on the exterior of either. In this way, the service life of the locking device (24) is greatly extended, and in practice its operation by remote wireless technology, enables much quicker attention to servicing of the teeth (14) on the shovel (100).

In operation, the locking device (24) is first inserted in the lock receiving recess (18) of the adaptor (10), with its sliding lock member (30) retracted.

The tooth (14) is then fitted over the leading end (16) of the adaptor (10). The tooth (14) is slid on the adaptor (10) until the lock receiving recess (18) aligns with and registers with the lock receiving socket (42). At this point, the locking device (24) is entirely or substantially concealed within and protected by the body of the adaptor (10) and the tooth (14), and is substantially inaccessible manually from the exterior of the adaptor (10) or the tooth (14). Using a suitable remote wireless device (W) (see FIG. 9), the motor (36) is then activated. The gear (34) rotates and moves the lock member (30) out of the body (26). The sliding lock member (30) will enter lock receiving socket (42) of the tooth (14) locking the tooth (14) in position onto the adaptor (10).

In order to remove the tooth (14), the motor (36) is then activated in reverse. This will retract the sliding lock member (30) from the lock receiving socket (42) in the tooth (14) back into the body (26).

Now, the tooth (14) can be removed from the adaptor (10).

Locking of the adaptor (10) on its shovel (100) using such a locking device (24) will involve essentially the same operations.

It will be appreciated that the power operated lock as described is capable of attaching removable attachments on earth moving machinery, whether such removable device is a tooth adaptor, or is a tooth itself, or of some other nature. Reference is therefore made in the claims to a releasable tool bit, it being the intention that this wording is generic to both the adaptor, and the tooth itself.

It is believed that the wireless technology involved in controlling each individual tooth lock, may take any suitable form as described earlier herein. It will, of course, be understood that each lock shall have its own unique signal. The operator of the equipment will have a hand-held device (W) capable of sending the separate individual signals, coded for the specific tool locks on the equipment.

The method of the use of the locking device is self-explanatory from the above description.

Thus, the locking of the tooth on the adaptor, or the locking of the adaptor on the support of the shovel, takes place by simply operating the hand held device (W), and moving the locking member along an axis which is transverse to the axis of the tooth or the adaptor. This is achieved without hammering of the tooth or the adaptor, or attempting to operate a threaded locking device or wedge, as was the case in earlier shovels.

While the lock receiving recess (18) is shown in the adaptor (10), and the lock receiving socket (42) in the tooth (14), this arrangement could be reversed in some cases.

It will also be appreciated that while extensive reference has been made to ground engaging system and earth moving equipment, the embodiments of the present disclosure are not necessarily limited solely to earth moving equipment. Other forms of power operated scoops and lifting devices are used, for example, when clearing a construction site, or removing debris from a collapsed building, to give only a few examples.

INDUSTRIAL APPLICABILITY

In practice, a machine, a work implement assembly, an adaptor assembly (e.g. locking device and adaptor), a tip and adaptor assembly, a locking device, and/or any combination of these various assemblies and components may be manufactured, bought, or sold to retrofit a machine or a work implement assembly in the field in an aftermarket context, or alternatively, may be manufactured, bought, sold or otherwise obtained in an OEM (original equipment manufacturer) context.

For example, an adaptor (or adaptor assembly) may be provided as a replacement part or retrofit in the field. Referring to FIGS. 1, 2, 7 and 8, the adaptor (10) may comprise a body (10') defining a longitudinal axis (11), and a transverse axis (13) that is normal to the longitudinal axis (11) (e.g. a horizontal axis, a vertical axis, etc.). The body (10') may include a leading portion (16) (may also be referred to as a nose portion) defining a lock receiving recess (18) extending transversely at least partially through the leading portion (16). The leading portion (16) may define at least one linear portion (21) in the lock receiving recess (18) that is configured to engage the power locking device (24).

In particular embodiments, two parallel linear portions (21) that at least partially define the lock receiving recess (18) are provided that are diametrically opposite of each other. This may not be the case for other embodiments of the present disclosure.

In certain embodiments as best seen in FIG. 8, the lock receiving recess (18) includes a counterbore (50) defining a head receiving portion (52) defining a head receiving portion diameter (54), and a head receiving portion blind depth (56). A rear portion (58) of the lock receiving recess (18) may define a rear portion diameter (60) (may also be referred to as a recess minimum diameter (60')) that that is less than the head receiving portion diameter (54). Also, the rear portion (58) may also define a rear portion blind depth (62) that is greater than the head receiving portion blind depth (56).

The adaptor (10) may further define a drilling (44) that extends transversely from the lock receiving recess (18) completely through the leading portion (16) as best seen in FIG. 7. The drilling (44) defining a drilling diameter (64) that is less than the recess minimum diameter (60') or rear portion diameter (60). These features may be omitted in other embodiments of the present disclosure.

A power locking device (24) that has an outer configuration that is at least partially complimentarily shaped to the counterbore (50) of the lock receiving recess (18) may be provided. More specifically, the power locking device (24) may include a head portion (66) that is disposed in the head receiving portion (52) of the lock receiving recess (18) including a pair of flat surfaces (68) (see also FIG. 5) that are configured to engage the linear portions (21) of the lock receiving recess (18) (see also FIGS. 1 and 2), and a cylindrical body (18) that is disposed in the rear portion (58) of the lock receiving recess (18). Other configurations of the power locking device (24) are possible in other embodiments of the present disclosure.

Figure 6:
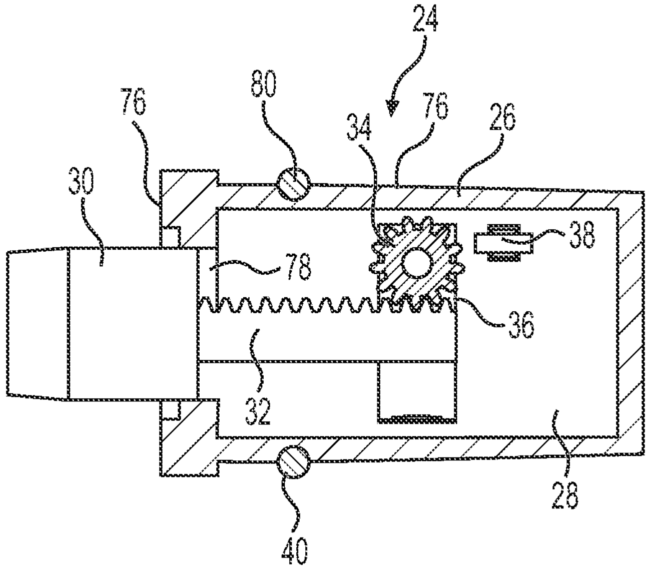
FIG. 6 is a sectional view of the locking device of FIG. 5 taken along lines 6-6 thereof.

Looking at FIG. 6, the power locking device (24) may include a sliding lock member (30), a motor (36) operatively associated with the sliding lock member (30), and circuits and a battery (38) that are operatively associated with the sliding lock member (30) and the motor (36). The sliding lock member (30), motor (36), circuits/battery (38) may be configured to extend and retract the sliding lock member (30) via wireless technology as mentioned previously herein.

Now, a tip and adaptor assembly that may also be provided as a retrofit or a replacement according to an embodiment of the present disclosure will be discussed.

Figures 2, 3:
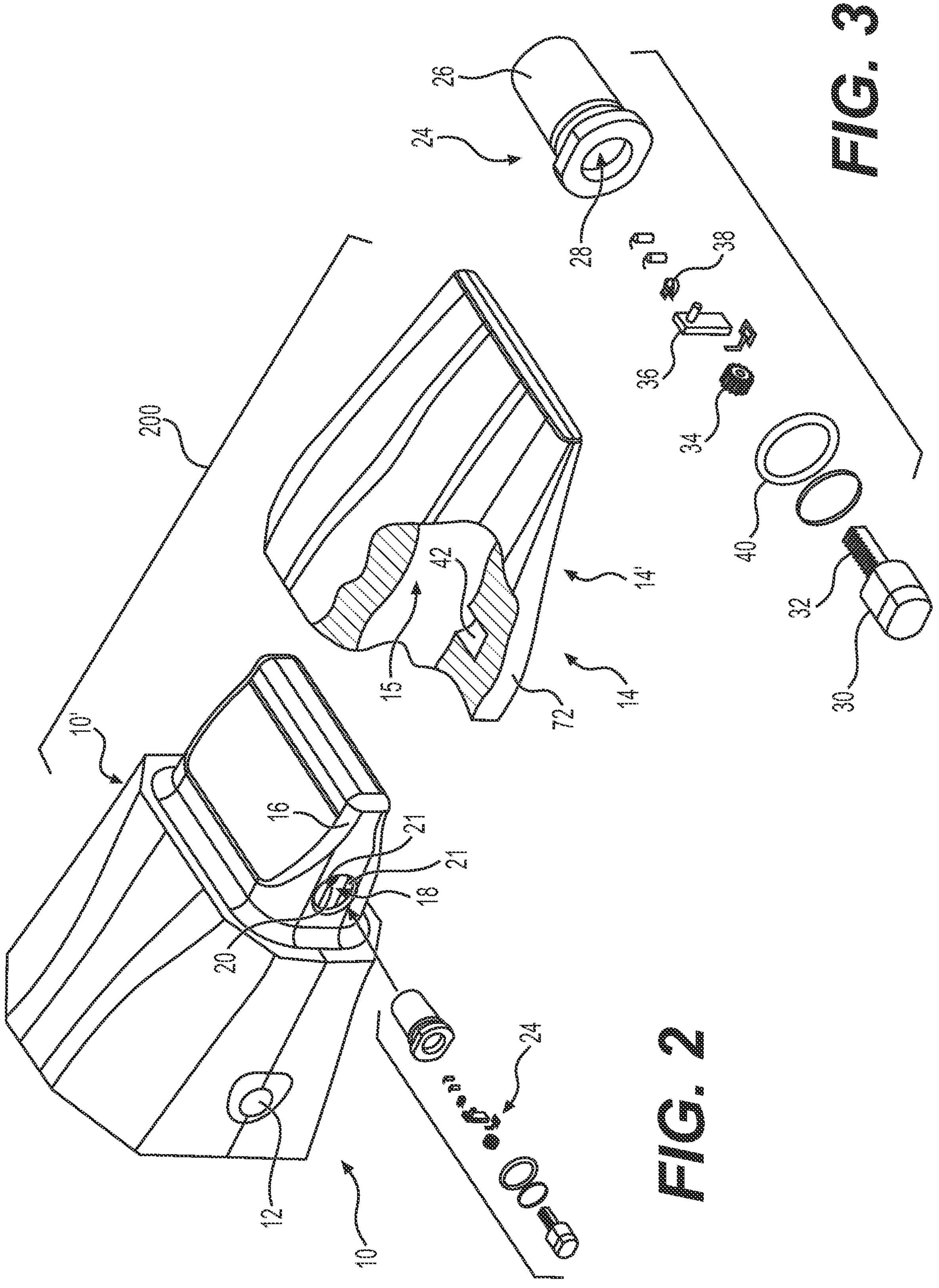
FIG. 2 is a view corresponding to FIG. 1 showing the locking device exploded.
FIG. 3 is an enlarged exploded view of the locking device of FIG. 2.
Figure 4:
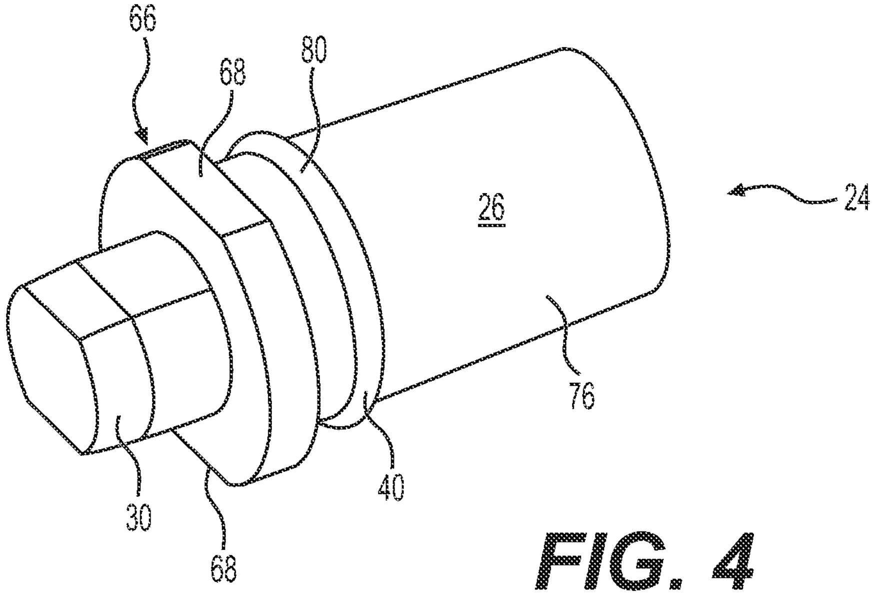
FIG. 4 is a perspective of the locking device shown in isolation.
Figure 5:
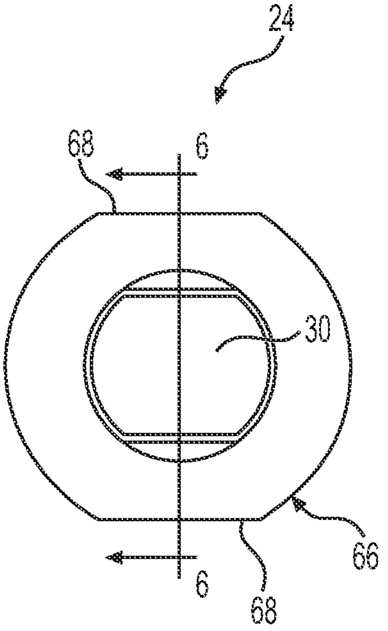
FIG. 5 is an end elevation of the locking device of FIG. 4.

Starting with FIGS. 1 and 2, the assembly (200) may comprise an adaptor (10) including a body (10') as just described above defining an exterior (70), and a tip (14') defining an exterior (72) and a hollow interior (15) configured to fit over the leading portion (16) of the adaptor (10). A lock receiving socket (42) may extend transversely from the hollow interior (15) toward the exterior (72) of the tip (14'). The lock receiving socket (42) may define a lock receiving socket blind depth (74). That is to say, the lock receiving socket (42) may not extend directly to the exterior (72) of the tip (14'). This may not be the case in other embodiments of the present disclosure.

Once assembled, the lock receiving socket (42) of the tip (14') is aligned with the lock receiving recess (18) of the adaptor (10) (see FIGS. 7 and 8).

Looking at FIGS. 7 and 8, the lock receiving recess may be configured as just described above herein. Moreover, the adaptor may define a bore or drilling as just described above herein. As seen in FIG. 7, the tip (14') may further define a tip drilling (76) that is aligned with the drilling (44) of the adaptor (10). This tip drilling (76) may extend transversely completely through the tip (14') to the exterior (72) of the tip (14'). This may not be the case for other embodiments of the present disclosure.

The assembly (200) may further comprise a power locking device (24) that is disposed in the lock receiving recess (18) of the adaptor (10).

In FIG. 6, the power locking device (24) may include an at least partially cylindrical body (26) defining a lock exterior (76) and a lock interior (28). A head portion (66) may define an aperture (78) extending from the lock exterior (76) to the lock interior (28). A sliding lock member (30) may be disposed in the aperture (78) that is configured to move transversely at least partially toward the lock interior (28) and at least partially toward the lock exterior (76).

The power locking device (24) may have a rack (32) attached to the sliding lock member (30) that is at least partially disposed in the lock interior (28), a gear (34) disposed in the lock interior (28) that meshes with the rack (32), a motor (36), and circuits/battery (38) that are disposed in the lock interior (28) that are configured to control the direction of rotation of the gear (34).

A retainer (80) may be provided in the form of an O-ring disposed about the lock exterior (76) that is configured to retain the power locking device (24) in the lock receiving recess (18) of the adaptor (10). Other forms of retention are possible including threads, etc. The O-ring may also prevent debris from infiltrating to the working portion of the power locking device through the drilling bores of the tip and adaptor.

An adaptor for use with a power locking device that is electrically or electronically controlled or activated will now be discussed with reference to FIGS. 7, 8 and 11. The adaptor (10, **10*a*) may comprise a body (10', 10") defining a longitudinal axis (11), and a transverse axis (13) that is normal to the longitudinal axis (11). The body (10*a*) may include a leading portion (16) defining a lock receiving recess (18') extending transversely at least partially through the leading portion (16). The lock receiving recess (18') may define a width (82) and a depth (84), and a ratio of the depth (84) to the width (82**) may be greater than 1.0 in certain embodiments of the present disclosure.

The lock receiving recess (18') may be a blind recess defining a bottom surface (84). The lock receiving recess (18') may define a recess minimum diameter (60") and a recess depth (86) that is greater than the recess minimum diameter (60").

The adaptor (10, **10*a*) further may also define a drilling (44, 44') that extends transversely from the lock receiving recess (18') completely through the leading portion (16). The drilling (44, 44') may define a drilling diameter (64, 64') that is less than the recess minimum diameter (60', 60"). A cable (88) (may also be a wire, etc.) may extend from the rear of the locking device (24, 24') through the drilling (44, 44') and out a cross-bore (90) that extends through the adaptor (10, 10*a*) and to the work implement such as a shovel (100) and eventually to a plug, a button, a switch, etc. so that the power locking device (24, 24') may be activated or deactivated to lock or unlock the power locking device (24, 24') intentionally with little concern of an unintentional unlocking of the power locking device (24, 24') due to debris, objects, personnel, etc. hitting a switch or button etc. that controls the operation of the power locking device (24, 24'). Thus, one or more wire conduits 46** may be provided in which a cable or wire are disposed to allow an electrical or electronic connection. In some embodiments, a plug may be provided into which the power locking device is connected at the bottom of the blind recess, etc. A similar plug connection may be employed at the interface between the adaptor and the shovel or other work implement, etc.

The power locking device (24') may have an outer configuration that is at least partially complimentarily shaped to the lock receiving recess (18'). In FIG. 11, the power locking device (24') may include an outer cylindrical surface (92) that has external threads (94) that are complimentarily configured to mate with the internal threads (96) of the lock receiving recess (18').

Figure 11:
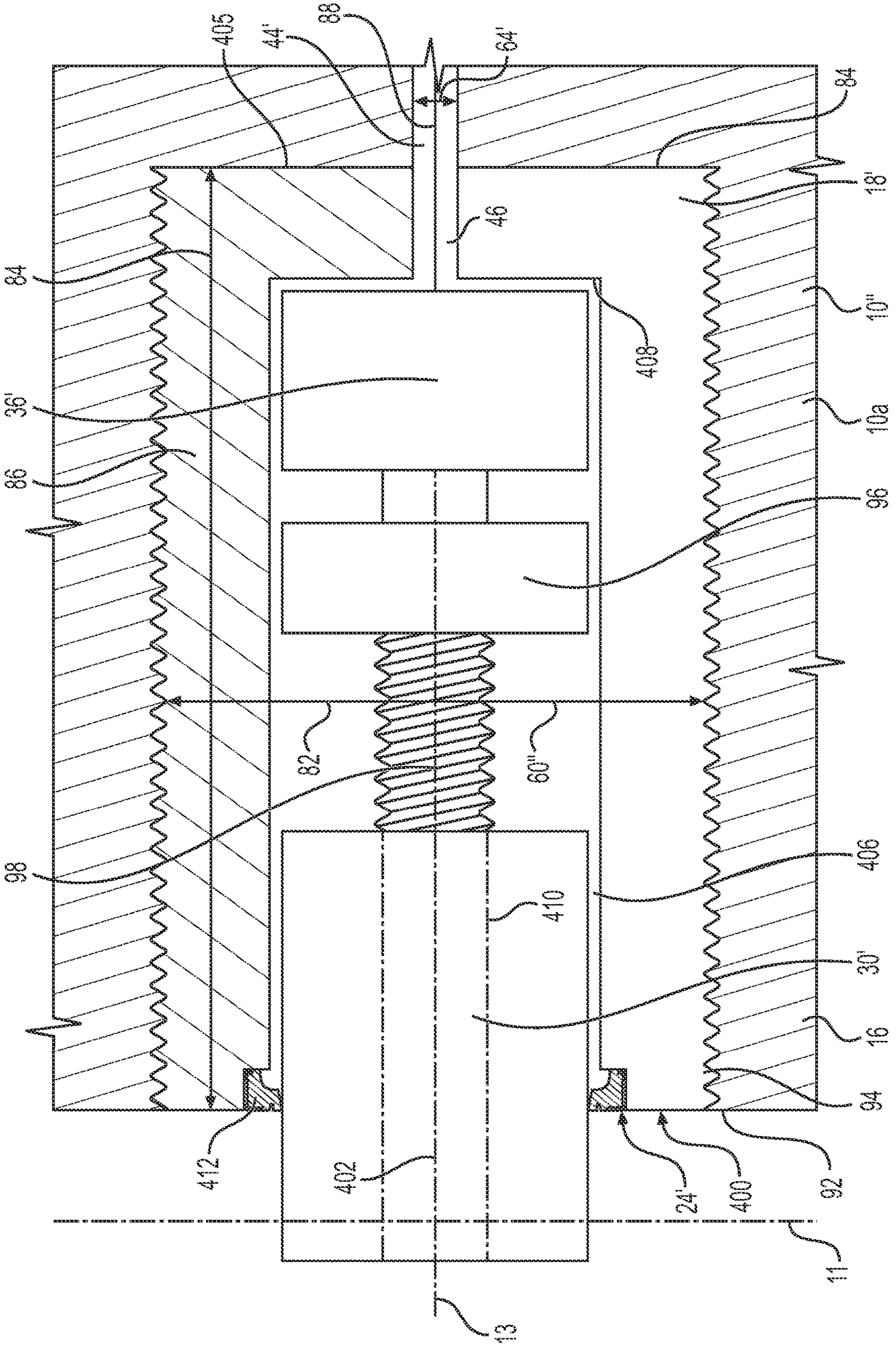
FIG. 11 is another embodiment of a locking device that is electrically or electronically activated via hardwiring and that may be used with a tip or an adaptor according to various principles of the present disclosure.

With continued reference to FIG. 11, the power locking device (24') further comprises a sliding lock member (30'), a motor (36') operatively associated with the sliding lock member (30'), a gear reducer (96) powered by the motor (36'), and a lead screw (98) connecting the gear reducer (96) to the sliding lock member (30'). The gear reducer (96) may slow the high rotation of the motor (36') to rotate the lead screw (98) more slowly and with higher torque, powering the translation of the sliding lock member (30').

More particularly, the power locking device in FIG. 11 may comprise a body (400) defining a longitudinal axis (402), a first axial end (404) disposed along the longitudinal axis (402), a second axial end (405) disposed along the longitudinal axis (402), and a blind bore (406) extending from the first axial end (404) including a bottom surface (408) that is disposed proximate the second axial end (406). The motor (36') may be disposed in the blind bore (406), and a gear reducer (96) may be disposed proximate to the motor (36') in the blind bore (406). A lead screw (98) may be disposed in the blind bore (406) that is connected to the gear reducer (96), and a sliding lock member (30') including a threaded aperture (410) that receives and mates with the lead screw (98). It should be noted that the threaded aperture (410) may be blind rather than a thru-hole. An anti-rotation feature (not shown) such as a key and keyway may be employed between the body (400) and the sliding lock member (30') in the blind bore (406) such that as the lead screw (98) rotates, the sliding lock member (30') is prevented from rotating and forced to translate. Alternatively, the sliding lock member may be externally threaded, being rotated by the gear reducer to cause the translation of the sliding lock member, etc.

In some embodiments, the motor (36'), the gear reducer (96), the lead screw (98), and the sliding lock member (30') are aligned along the longitudinal axis (402). A wire or cable may extend from the power locking device (e.g. from the rear of the power locking device. This may not be the case for other embodiments of the present disclosure.

The sliding lock member (30') may extend axially past the first axial end (404) outside of the body (400), and may further comprise a lip seal (412) that is disposed in the blind bore (406) proximate to the first axial end (404), and contacting the sliding lock member (30'). This may prevent debris from entering into the device. So, the body of the device may be a sealed tube.

The body (400) may comprise a cylindrical configuration including an outer cylindrical surface (92) (e.g. see FIG. 11) with a head portion (66), and a rear portion (58) (e.g. see FIG. 6). Also as shown in FIG. 6, a battery and circuitry (38) may be disposed in the blind bore (406) proximate to the bottom surface (408), and the motor (36') may be disposed proximate to the battery and circuitry (38). A sealing ring (40) may be disposed on the rear portion (58) of the body but not necessarily so.

In FIG. 11, the outer cylindrical surface (92) may include external threads (94). In such an embodiment, a conventional wrench or a spanner wrench, etc. may be used to install and uninstall the power locking device from the adaptor. Other methods of attachment may be employed such as fasteners, retaining plates, snap rings, etc.

Any of the power locking devices disclosed herein may be wirelessly activated, and/or electrically/electronically activated via hardwiring.

Any of the aforementioned components may be made from any suitable material including iron, grey-cast iron, steel, plastic, rubber, foam, etc.

The provision of the locking device that is actuated wirelessly or electrically/electronically via hardwiring such that it is shielded from the environment may protect the locking device, prolonging its life while also decreasing the likelihood that the locking device becomes jammed, which can result in difficulty in removing a tooth, and adaptor, or a tool mount, etc. from a work tool such as a shovel, a bucket, etc.

Figure 10:
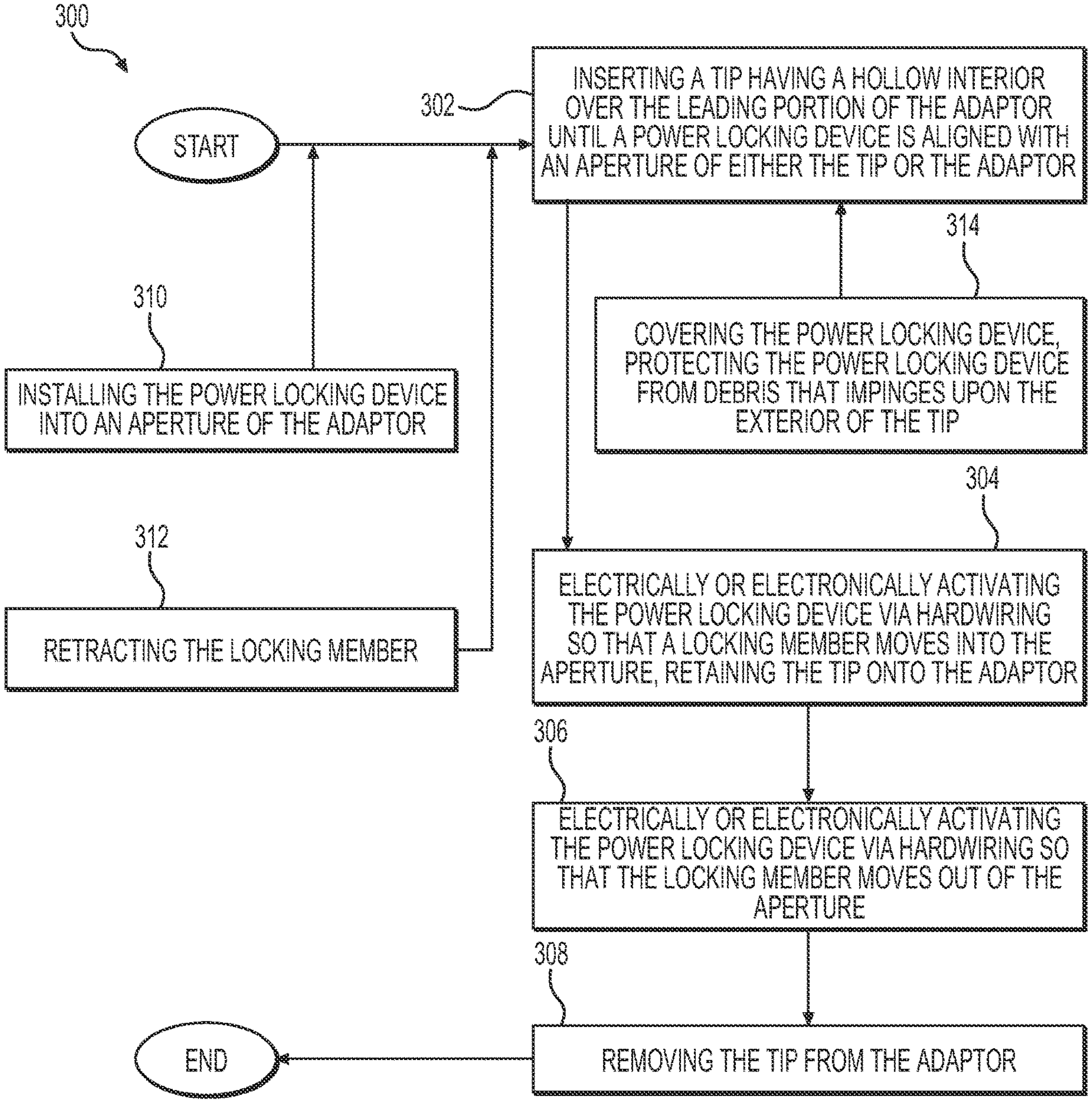
FIG. 10 is a flow chart illustrating a method according to an embodiment of the present disclosure for attaching or detaching a tip to an adaptor using a power locking device.

To that end, a method for attaching and detaching a tip to an adaptor using a power locking device in the field according to an embodiment of the present disclosure may be understood with reference to FIG. 10.

The method (300) may comprise inserting a tip having a hollow interior over the leading portion of the adaptor until a power locking device is aligned with an aperture of either the tip or the adaptor (step 302), and electrically or electronically activating the power locking device via hardwiring so that a locking member moves into the aperture, retaining the tip onto the adaptor (step 304). The locking member may translate, rotate, etc.

The method (300) may further comprise electrically or electronically activating the power locking device via hardwiring so that the locking member moves out of the aperture (step 306), and removing the tip from the adaptor (step 308). The locking member may translate, rotate, etc.

The method (300) may further comprise installing the power locking device into an aperture of the adaptor (step 310), and retracting the locking member (step 312). Steps 310 and 312 may occur before steps 302 and 304 but not necessarily so.

Inserting the tip over the adaptor may cover the power locking device, protecting the power locking device from debris that impinges upon the exterior of the tip (step 314).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An adaptor for use with a power locking device, the adaptor comprising:

a body defining a longitudinal axis, and a transverse axis that is normal to the longitudinal axis, the body including a leading portion defining a lock receiving recess extending transversely at least partially through the leading portion, and a wire conduit that is in communication with the lock receiving recess; and wherein the lock receiving recess defines a width and a depth, a ratio of the depth to the width is greater than 1.0, and a power locking device is configured to be hardwired to a wire disposed in the wire conduit.

2. The adaptor of claim 1 wherein the lock receiving recess is a blind recess defining a bottom surface.

3. The adaptor of claim 1 wherein the lock receiving recess includes a cylindrical configuration and the width is a recess minimum diameter.

4. The adaptor of claim 3 wherein the wire conduit is a drilling that extends transversely from the lock receiving recess completely through the leading portion, the drilling defining a drilling diameter that is less than the recess minimum diameter.

5. The adaptor of claim 4 in which the power locking device that has an outer configuration that is at least partially complimentarily shaped to the lock receiving recess.

6. The adaptor of claim 5 wherein the lock receiving recess includes internal threads, and the power locking device includes an outer cylindrical surface including external threads that are complimentarily configured to mate with the internal threads of the lock receiving recess.

7. The adaptor of claim 5 wherein the power locking device further comprises a sliding lock member, a motor operatively associated with the sliding lock member, a gear reducer powered by the motor, and a lead screw connecting the gear reducer to the sliding lock member.

8. A method for attaching and detaching a tip to an adaptor using a power locking device, the method comprising:

providing the adaptor having a body that defines a longitudinal axis and a transverse axis that is normal to the longitudinal axis, the body including a leading portion defining a lock receiving recess extending transversely at least partially through the leading portion;

inserting a tip having a hollow interior over the leading portion of the adaptor until the power locking device is aligned with an aperture of either the tip or the adaptor; and electrically or electronically activating a motor of the power locking device via hardwiring so that a locking member of the power locking device moves into the aperture, in which the locking device is hardwired to a wire disposed in a wire conduit that is in communication with the lock receiving recess, the lock receiving recess defines a width and a depth, and a ratio of the depth to the width is greater than 1.0.

9. The method of claim 8 further comprising:

electrically or electronically activating the power locking device via hardwiring so that the locking member moves out of the aperture; and removing the tip from the adaptor.

10. The method of claim 8 further comprising:

installing the power locking device in the lock receiving recess; and retracting the locking member;

wherein inserting the tip over the adaptor covers the power locking device, protecting the power locking device from debris that impinges upon the exterior of the tip.

* * * * *